J. B. VELIS.
TIRE PROTECTOR.
APPLICATION FILED NOV. 24, 1916.
1,224,341.
Patented May 1, 1917.
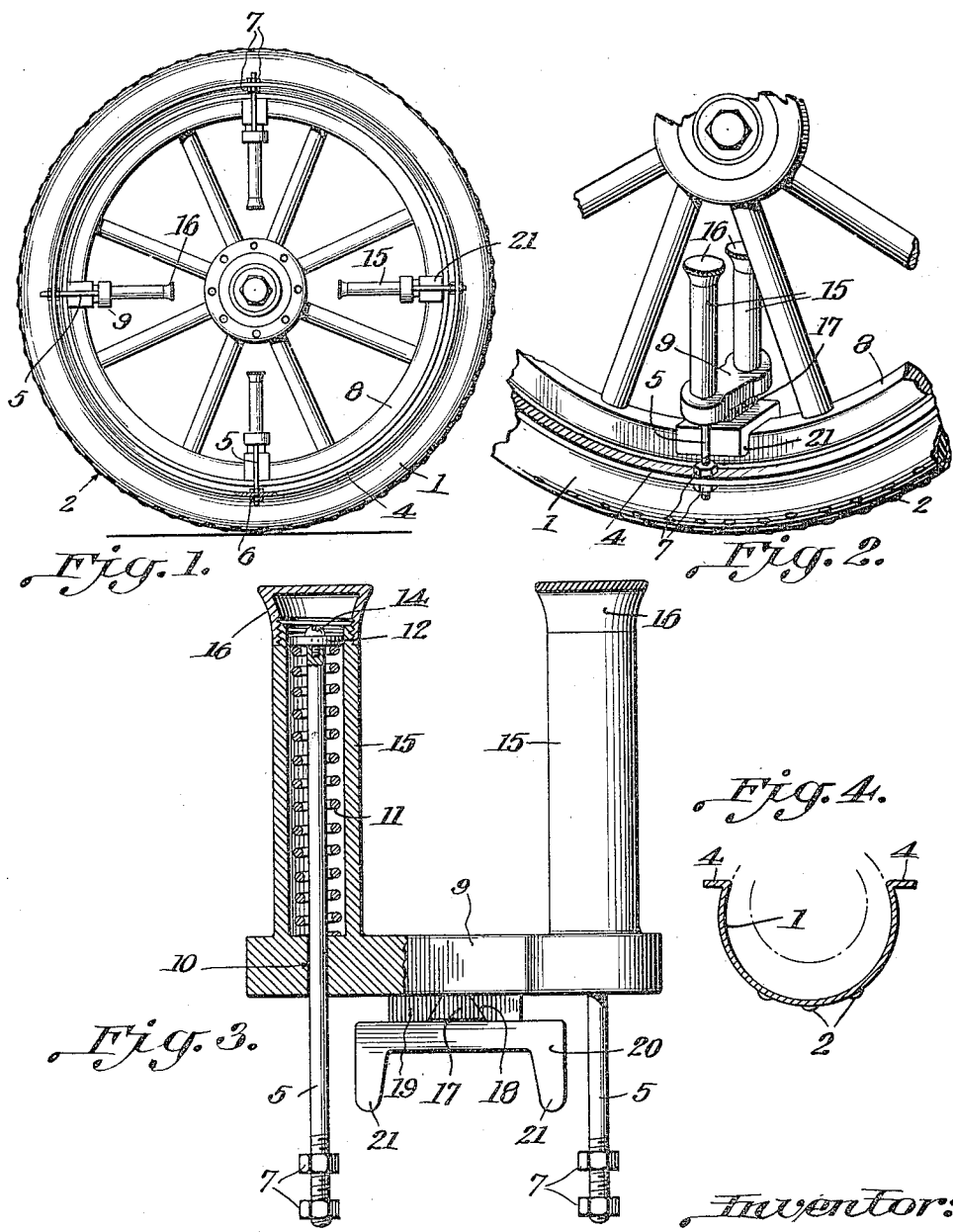
Inventor:
Jorge Borges Velis
By Ramsey and Parmelee,
Att'ys.

UNITED STATES PATENT OFFICE.

JORGE BORGES VELIS, OF HABANA, CUBA, ASSIGNOR OF ONE-HALF TO ALEJANDRO ANGULO PINZON, OF HABANA, CUBA.

TIRE-PROTECTOR.

1,224,341.  Specification of Letters Patent.  Patented May 1, 1917.

Application filed November 24, 1916. Serial No. 133,256.

*To all whom it may concern:*

Be it known that I, JORGE BORGES VELIS, a citizen of Cuba, and a resident of Habana, Cuba, have invented certain new and useful Improvements in Tire-Protectors, of which the following is a specification.

This invention relates broadly to protectors for tires and more particularly to pneumatic tires.

The principal object of the invention is to provide a protector of this type which may be yieldingly maintained in position on the tire in such manner as to move in unison therewith when the tire is suddenly compressed, so as not to interfere with its resilient qualities.

A further object of this invention is to provide improved means by which the protector may be readily attached to, or removed from the tire.

These objects together with attendant advantages will in part be obvious and will in part be pointed out in the specification hereinafter following by reference to the drawings forming a part thereof, in which like characters of reference have been used to represent like parts throughout the several views.

Figure 1 is a side view of a wheel having my protector applied thereto.

Fig. 2 is a perspective view of one of the securing members.

Fig. 3 is an enlarged detail view partly in section of one of the securing members.

Fig. 4 is a cross sectional view showing the position of the casing on the tire.

Referring more particularly to the drawings, the protector preferably comprises a casing 1 which may be of metal or other suitable material, having a plurality of studs or projections 2 forming a tread surface therefor. The casing in its preferred form is made of a single piece of metal adapted to extend entirely around the tread surface of the tire, and so related thereto in size that it may be applied when the tire is deflated, and partly held in position by the subsequent inflation of the tire.

The casing 1 is provided with flanges 4 projecting outwardly from its edges. For firmly securing the casing to the wheel I provide rods 5 having their outer ends threaded and adapted to pass through openings 6 in said flanges. The rods may then be secured in position by means of lock nuts 7.

In order that the casing may be held in yielding engagement with the wheel felly 8, so that it may move with respect thereto when the tire and the protector encounter an obstruction or the like, or when the tire becomes partly deflated, I provide a cross piece 9, having openings 10 adjacent the opposite ends thereof adapted to loosely receive the rods 5. Mounted around the inner ends of the rods, are compression springs 11 resting at their outer ends against the inner surface of the cross piece, and held in position on the rods by means of the cross heads 12, which are in turn removably locked in position by the set screws 14. For incasing the springs to prevent the accumulation of dust and dirt thereon while in use, I have provided cylinders 15 carried by the cross pieces concentrically with the openings therein and having their inner surfaces so constructed as to act as guides for the cross heads 12. To permit access to the interior of the casing, I may provide removable caps or closures 16.

An important feature of the present invention resides in the means for attaching each of the cross pieces and its associated parts to the wheel. In its preferred form this means preferably comprises a dove-tailed projection 17 on the outer surface of the cross piece, adapted to slidably engage the undercut key way or slot 18 formed in the block 19 on the spanner member 20. The spanner member is preferably U-shaped, and has the opposite sides 21 inclined so as to frictionally engage the sides of the felly 8 and become firmly wedged in position thereon. By reason of this construction the cross piece may be firmly held in place without employing any fastening means extending into the felly to weaken or destroy the finish thereof. After the spanner member has been placed in position, the dove-tail projection is slid into the key way. The parts may then be relatively adjusted to properly aline the opening in the flanges with the opening in the cross pieces to eliminate friction and wear on the rods.

The formation of the key ways prevents lateral movement between the parts, and the rods 5 prevent accidental longitudinal or sliding movement therebetween.

While I have described and illustrated the preferred embodiment of my invention, it will be obvious that changes may be made therein without departing from the spirit of my invention. The number of fastening devices may be changed at will to suit any desired conditions of operation.

What I claim is—

1. A protector for tires, comprising a casing, rods secured at one end to said casing, cushioning means operatively engaging the opposite ends of said rods, a cross piece upon which said cushioning means rest, a spanner member adapted to engage a wheel felly, and means for detachably securing said cross piece to said spanner member.

2. A protector for tires, comprising a casing, rods secured at one end to said casing, cushioning means operatively engaging the opposite ends of said rods, a cross piece upon which said cushioning means rest, a spanner member, and a sliding connection between said spanner member and said cross piece.

3. A protector for tires, comprising a casing, rods secured at one end to said casing, cushioning means operatively engaging the opposite ends of said rods, a cross piece, upon which said cushioning means rest, a U-shaped spanner member, and a dove-tailed joint for detachably securing said cross piece to said spanner member.

4. A device for securing a tire protector in position, comprising a cross piece, cylindrical members thereon, cushioning means within said members, rods connecting the protector to the cushioning means, a spanner member adapted to engage a wheel felly, and means for securing said cross piece to said spanner member.

JORGE BORGES VELIS.

Copies of this patent may be obtained for five cents each, by addressing the "Commissioner of Patents, Washington, D. C."